United States Patent [19]
Shaler et al.

[11] 3,713,542
[45] Jan. 30, 1973

[54] SYSTEMS FOR THE REMOVAL OF POLLUTANTS FROM WATER

[76] Inventors: Amos J. Shaler, 705 W. Park Ave., State College, Pa. 16801; Daniel C. McLean, P.O. Box 117, Elm Street, Lemont, Pa. 16851

[22] Filed: Feb. 22, 1971

[21] Appl. No.: 117,435

[52] U.S. Cl. ............... 210/170, 210/189, 210/269, 210/286, 61/32
[51] Int. Cl. ............................. C02b 1/14, C02c 5/02
[58] Field of Search .......... 61/30, 32; 210/24, 30, 33, 210/40, 153, 170, 189, 269, 286

[56] References Cited

UNITED STATES PATENTS

| | | | |
|---|---|---|---|
| 3,244,621 | 4/1966 | Bouthilet | 210/33 X |
| 802,183 | 10/1905 | Durbrow | 61/32 X |
| 3,436,344 | 4/1969 | Canning et al. | 210/24 X |
| 58,868 | 10/1866 | Mietzsch | 210/286 |
| 3,401,114 | 9/1968 | Carlton et al. | 210/30 |
| 671,685 | 4/1901 | Xander | 210/286 X |
| 426,988 | 4/1890 | Crocker | 210/170 X |
| 1,995,367 | 3/1935 | Stewart | 61/32 X |
| 3,436,343 | 4/1969 | Smith | 210/33 X |

*Primary Examiner*—Samih N. Zaharna
*Assistant Examiner*—Thomas G. Wyse
*Attorney*—Robert F. Custard

[57] ABSTRACT

An inorganically polluted waterway is bridged by a dam containing a wall of carbon. The carbon is continuously regenerated by cycling through a thermal converter. Organically polluted sewage effluent and water from the waterway are continuously mixed and piped to the top of the wall of carbon, passed through the wall of carbon, and clean water is continuously drained from the bottom of the wall of carbon. An alternative installation is positioned adjacent to a restricted-flow body of water in an excavation to maintain the necessary water level differentials.

4 Claims, 4 Drawing Figures

PATENTED JAN 30 1973　　　　　　　　　3,713,542

INVENTORS
Amos J. Shaler & Daniel C. McLean
BY
ATTORNEY

PATENTED JAN 30 1973 3,713,542

INVENTORS
Amos J. Shaler & Daniel C. McLean

BY Robert H... 
ATTORNEY

SYSTEMS FOR THE REMOVAL OF POLLUTANTS FROM WATER

BACKGROUND OF THE INVENTION

1. Field of the Invention

The present invention has as its primary object the lowering of the cost of primary purification of inorganically polluted waters to the point where large bodies of waste waters or otherwise contaminated waters can be purified to a desirable degree. Among such bodies would be millraces, creeks, streams, canals, and small rivers, and certain lacustrine, riverine, and costal inlets, coves, port facilities, and harbors, where the mixing of the waters with the adjacent greater bodies of water, such as large rivers, lakes, or oceans, is restricted. Such restricted-flow watercourses and inlets are becoming polluted to the point where their fauna has largely disappeared, where they constitute a distinct hazard to health and welfare, and where their corrosive effect is often so great as to destroy the works of man and nature.

An additional object is the provision of an adsorption wall or column within a dam which utilizes the hydrostatic head of a flowing waterway retained by the dam to drive the water of the waterway through the adsorption wall in order to reduce the pollution in the waterway downstream from the dam.

Another object is the utilization of an adsorption wall of carbon within a dam for the dual purpose of removing pollutants from the waterway which the dam bridges and also from the sewage effluent from a primary or lower sewage treatment plant in the vicinity of this dam.

A further object is the provision of a continuously regenerating adsorption wall or column of three parts, in which regenerated adsorption material and polluted water are added to one top part, spent adsorption material and certain pollutants are removed from a second top part, and spent adsorption material and additional pollutants are removed from a bottom part, thereby improving the adsorbability of the wall or column.

2. Description of the Prior Art

Biological systems, such as are in use for sewage treatment, and direct sand, clay or carbon adsorption systems can only remove suspended solids, microorganisms, and dissolved organic pollutants. Other systems have been developed to remove the inorganic pollutants from mine and mill waters, and these involve, for example, the use of large quantities of lime for precipitation of the inorganic pollutants. The cost of these systems is such that at present they are only marginally economical or even so uneconomical that they cannot be used without Governmental partnership. Also they have the disadvantage of producing a secondary disposal problem in the eventual removal of the insoluble salts precipitated by the reaction between the additive and the pollutants.

The major problem in the fight against this type of pollution is that the economic cost is so large that there is often no apparent way to pay for it except through outright national funding. So far, the major effort has been directed at preventing pollution at its source, but this effort has not caught up with the problem. There have also been a few, hitherto economically unsuccessful, attempts to recover some at least of the costs of decontaminating such waters by recovering the values they contain, as for instance the iron from the waters polluted by effluents from steel mills. But no large-scale economically valuable system has yet been successfully operated.

SUMMARY

The approach utilized by the applicants has been to find a large-scale use for the inorganically polluted waters that might sufficiently offset the cost of decontaminating them. Recent investigations have demonstrated that the admixture of ordinary municipal sewage effluent with these waters converts to adsorbable form a sufficient number of the inorganic pollutants in sufficient proportion to make possible a substantial decontamination if these converted forms can then be removed in turn from the water-sewage effluent mixture. The quantity of municipal sewage effluent generated in the vicinity of polluted waterways is often large enough to make possible the primary treatment of large volumes of inorganically polluted waters. Since these municipalities are already prepared to incur the cost of treating their sewage effluent, if at the same time and with relatively little additional expenditure they have the choice of also decontaminating and keeping relatively clean the waterways that border or traverse their territory, a considerably lower expenditure will have to be made than if an attempt is made to treat the inorganically polluted waters separately from the sewage effluent.

The present invention includes a first installation wherewith the pollution of a millrace, creek, stream, canal, or small river can be removed after controlled admixture of sewage effluent, and an additional installation wherewith such a method can be applied to the continuous reduction to an acceptable degree of the pollution of inlets on lakes or seashores where the exchange of water with the adjacent greater body of water is restricted either by geographical features or by the works of man, such as port piers, breakwaters and the like. It is in these restricted portions of rivers, estuaries, and oceans that the greatest pollutional problem exists in the first place, since the restriction of flow prevents the dilution of the waters, and since it is where these restrictions exist that man has constructed many communities and industrial plants. Therefore, since it is in the vicinity of such bodies of water that sewage effluent is readily available, both the need and the solution are present. In flowing waterways also, the greatest need for depollution is near the municipalities, where the solution, that is, the sewage effluent, is near at hand. Whenever the following terms: waterway, water, water system, or body of water are used throughout the specification and claims herein, they are to be construed broadly to include the appropriate portions of industrial waste lagoons, sanitary landfill drainage sumps, and their connections to larger water bodies.

Applicants' method consists of providing an extensive wall of char or activated carbon, down the height of which the mixture of sewage effluent and unclean water is allowed to flow by gravity. Carbon of a size larger than passing through 50-mesh U. S. Standard Sieve size has been used; however, carbon of other sizes may be used and the individual carbon particles will fragment or agglomerate during the process to produce various sizes of carbon particles. The spent carbon is removed from the top of the wall at a sufficient rate, and replaced with new or regenerated carbon at a slightly lower rate, so that most of the pollutants are also removed. A part of the spent carbon, with its load of organic matter from the sewage effluent and inorganic matter from the waters combined with it, is recarbonized in a thermal converter to provide the new or regenerated carbon. But the organics themselves are converted to carbon and gases. This extra carbon is not needed in the next cycle. Therefore, a portion of the spent carbon is not recarbonized, but used as fuel, together with some combustible municipal wastes if needed, to provide the heat for the carbonization. This at the same time makes possible the continuous removal of a corresponding portion of the inorganic matter, which is carried by the portion of spent carbon used as fuel, in the form of ash. In this form it is ideally suited as starting material for processes capable of recovering whatever values are present in the polluted waters, such as metals, trace elements for crop nutrition, or soil conditioners. The gases from both the carbonizing and the combustion sides of the converter can, if there are any values in them, be used as fuel, as a source of acids, or as additives to the intake waters to promote their adsorbability on carbon, the rest can be vented to the atmosphere, where they are either harmless, or constitute a degree of air pollution no worse than the evolution of carbon dioxide which would have emanated from a biological treatment of the sewage effluent in the first place. The sidewalls of the converter are readily fitted with boiler tubes capable of recovering, as steam heat suitable for power generation, the excess heat generated by the converter fire, and indeed, an excess of municipal combustible waste can be disposed of at the same time to augment such a useful by-product.

In the case of waterways, millraces, creeks, streams, canals, and small rivers, the necessary flows of water, sewage effluent, and carbon can be obtained by damming the waterway. In the case of inlets, ports, and other bodies of water without a substantial flow, it will be necessary to dig an excavation to provide the necessary flow of water and sewage effluent through applicants' installation. The capacity of the intake system is controlled by valving to a flow such that at mean low water level, the water level above the carbon column remains at a constant level. When the water flow in the waterway is greater than it is at the mean low water level, excess water flows over the dam; this part of the water is not treated. Since during the high-water periods the pollution is least on account of greater dilution, this fact does not substantially decrease the efficiency of the system; it would be decreased to a far greater degree if the water loading of the carbon wall were to be allowed to vary in complete dependence upon the water level of the waterway. When the water flow is less than the mean low water level, the quantity of water treated is automatically allowed to become less; if the balance between sewage effluent and mass-flow of pollutant is thereby upset, no harm results, since the converter is perfectly capable of coping with organic pollutants alone, or with any concentration ratio of sewage effluent to inorganic pollution greater than that occurring at mean low water level.

Along the bottom of the carbon wall a relatively small proportion of the carbon is extracted for regeneration or recarbonization. The great bulk of the recycled carbon is continuously removed from the top of the carbon wall along with the bulk of the pollutants, which have been adsorbed and filtered out principally in that region. The necessity for the removal of a small portion of the carbon from the bottom of the wall arises from the fact that some pollutant species, primarily small-molecule soluble species, are slowly adsorbed, and would slowly saturate the carbon wall, if only the top portion of carbon were removed, regenerated, and renewed. Another reason for removing some of the carbon from the bottom of the carbon wall is that the finest particles of carbon would otherwise accumulate and clog the column.

Inside the carbon wall the water flows downward between the carbon particles, then upward through screens and discharge pipes having a capacity such that when the flow passing through them is equal to the flow of the waterway at the annual mean low water level, their back pressure is equal to the hydrostatic head of the system. Thus the downward flow through the carbon wall is at all times approximately the same, except when the waterway flow is less than at the mean low water level, when it is less. But this is the time also when the pollution is at its highest concentration and when the flow through the carbon wall must be slowest.

From time to time for short periods the flow through the system and carbon column may be reversed to backwash the screens and temporarily partially fluidize the carbon wall to prevent long-term decreases in its permeability.

For bodies of water such as inlets, not having a flow available to provide a hydrostatic head to drive the flow through the carbon wall, an additional embodiment is necessary. It simply consists of excavating a hole in the bank of the river, lake, or ocean. This hole is concrete lined, and across the middle contains a dam similar to the one described above. Polluted water and sewage effluent are continuously allowed to flow by gravity into the hole on one side of the dam, and the clean water is continuously pumped out of the hole on the other side, to maintain a water head. The water is pumped through pipes to a discharge point as far as possible from the installation, preferably to the point where the main current from the larger adjacent body of water feeds into the inlet. In the case of a riverine inlet, the clean water would be pumped into the river just downstream from the inlet entrance. Alternately, the clean water can be subjected to secondary and tertiary treatment and be pumped to the municipal water supply. If a suitable water body is available at a lower level, the clean water may be drained directly into such water body and the pump omitted.

BRIEF DESCRIPTION OF THE DRAWINGS

The objectives of the invention and the manner in which it is carried out will be apparent from the following description and the accompanying drawings, wherein.

DESCRIPTION OF THE PREFERRED EMBODIMENTS

Figure 1:
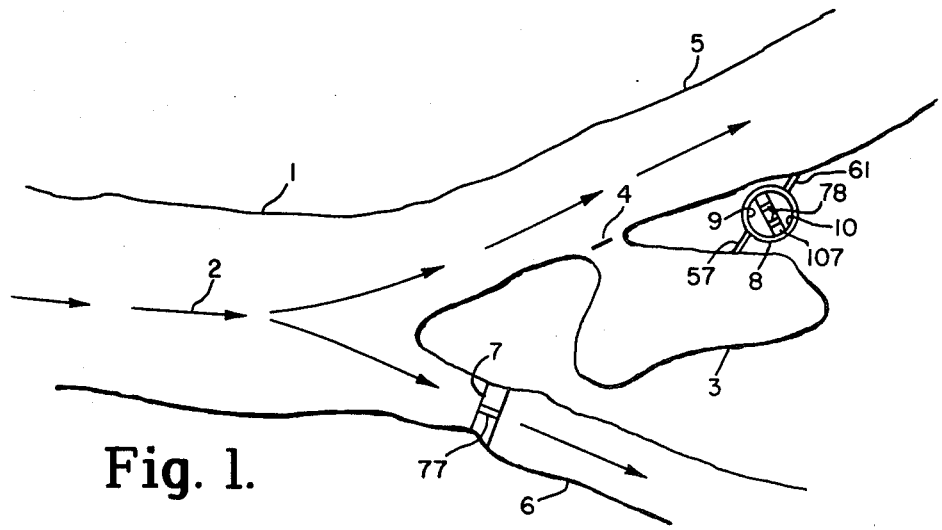
FIG. 1 is a plan view showing the orientation of the installations embodying the invention with respect to the source of polluted water being treated.

Referring to FIG. 1, a polluted river 1, having a flow 2 in the direction of the arrows, is shown branching into a main channel 5 and a small branch waterway 6. An inlet 3 is connected to main channel 5 of river 1 by an area of restricted water-mixing 4. Waterway 6 is bridged by a retaining structure or dam 7 incorporating an embodiment of applicants' invention. Dam 7 is divided into two operative units by a vertical wall 77. An excavation 8 is positioned adjacent to inlet 3. Excavation 8 is bridged by a retaining structure or dam 107 which divides excavation 8 into two water retaining areas 9 and 10. Retaining structure or dam 107 is similar to retaining structure or dam 7 and incorporates an additional embodiment of applicants' invention. Dam 107 is divided into three operative units by walls 78. It will be understood that, while dam 7 has been shown as divided into two units and dam 107 has been shown as divided into three units, each dam may be a single unit or divided into as many units as convenient to facilitate repair and renovation. However, at least two units would be utilized in all cases except where a holding basin is available for use during periods of unit shutdown for repairs.

Figure 2:
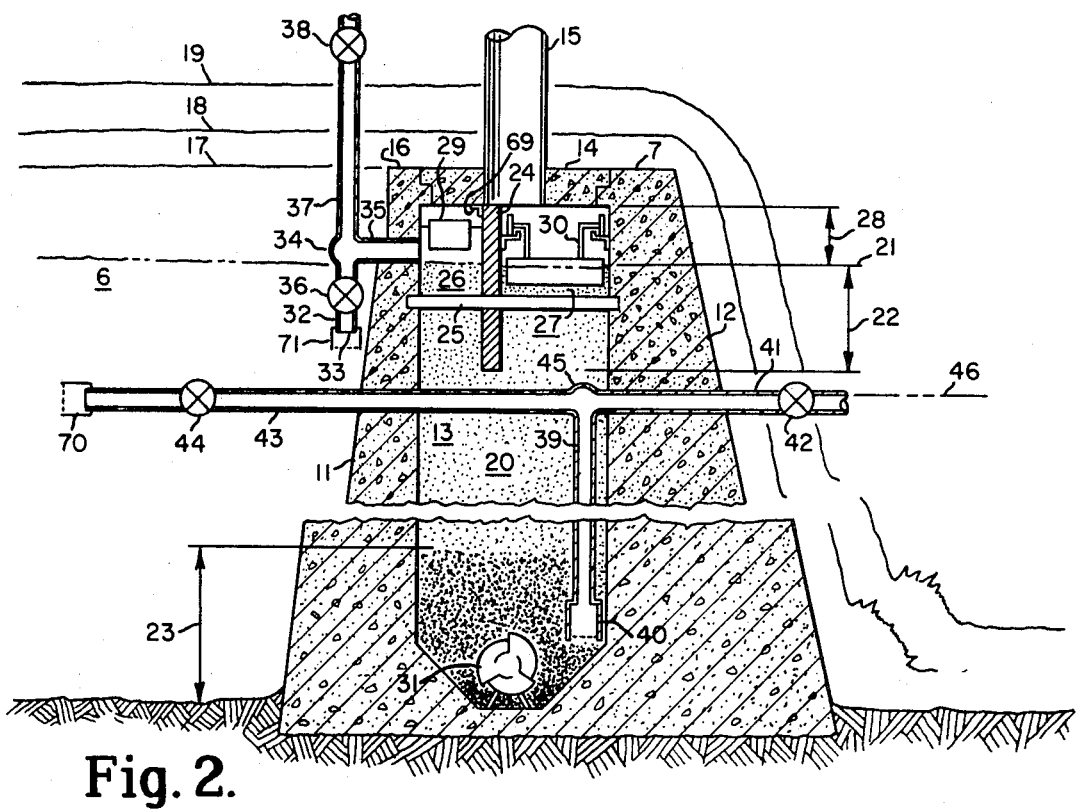
FIG. 2 is a vertical sectional view of an installation embodying one form of the invention.

Referring to FIG. 2, waterway 6 which contains a substantial portion of inorganic pollutants is bridged by retaining structure or dam 7 constructed of concrete or masonry. Dam 7 includes an upstream side 11, a downstream side 12, and a generally vertical hollow central portion 13. A roof 14 covers central portion 13 of dam 7 and is vented by vent 15 to facilitate the escape of gases. Dam 7 is positioned so that the highest portion 16 is generally horizontal and placed at a level representing the height of water in waterway 6 at its lowest period of the year, the mean low water level 17. The mean water level 18 and the maximum water level 19 of waterway 6 are also shown for purposes of illustration. A wall of particulate carbon 20 is supported by and within hollow central portion 13 of dam 7 up to a nominal top level 21. Wall of carbon 20 includes a top portion 22 and a bottom portion 23. A baffle structure 24 generally parallel to the inside surface of dam 7 is supported by rods 25 inset into dam 7 and a support member 69 attached to roof 14. It will be understood that either rods 25 or support member 69 could be used alone, or other support means provided to maintain baffle 24 in position. Baffle structure 24 is positioned to divide top portion 22 of wall of carbon 20 into a first top part 26 and a second top part 27 and restricts the flow of particulate carbon therebetween. A substantial vertical gap 28 exists between the nominal top level 21 of carbon 20 and underside of roof 14. Within gap 28 and immediately above first top part 26 of wall of carbon 20, a means for adding particulate carbon 29 is supported by dam 7. Within gap 28 and immediately above second top part 27 of wall of carbon 20, a first means for extracting spent carbon 30 is supported by dam 7. At the lowest central portion of bottom portion 23 of wall of carbon 20, a second means for extracting spent carbon 31 is supported by dam 7. Means for adding particulate carbon 29, means for extracting spent carbon 30, and means for extracting spent carbon 31 are conventional commercially available components. For purposes of illustration, element 31 is shown as a screw-drive type and element 30 as a traveling design; however, since elements 29, 30, and 31 are conventional and commercially available, any other devices which will perform the desired functions may be utilized. A pipe 32 including an intake end 33 is connected to a manifold 34 which in turn is connected to the interior of dam 7 by a pipe 35. Additional pipes 32 and pipes 35 may be provided if the width of waterway 6 makes additional pipes desirable. Each of pipes 32 is provided with a screen means 71. A valve means 36 is positioned within pipe 32 and may be adjusted to be open, closed, or partially closed. Pipe 32, and pipe 35, together with manifold 34 form a conduit connecting the polluted water in waterway 6 upstream of dam 7 to first top part 26 of wall of carbon 20 within hollow central portion 13 of dam 7. A source of sewage effluent containing substantial amounts of organic pollutants is connected to a pipe 37 which is connected to manifold 34. A valve means 38 is positioned within pipe 37 and may be adjusted to be open, closed, or partially closed. Manifold 34 functions as a mixing chamber for the polluted water and sewage effluent flowing therethrough, and pipe 35 functions as a conduit to discharge the mixture therein into first top part 26 of wall of carbon 20.

A series of pipes 39 including screened water receiving ends 40 leads from bottom portion 23 up through wall of carbon 20 to join a manifold 45 which then joins with a drain pipe 41 which leads through downstream side 12 of dam 7 to discharge clean water downstream. A valve means 42 is positioned within pipe 41 downstream of manifold 45 and may be adjusted to be open or closed. Pipes 39, manifold 45, and pipe 41 from a conduit supported by dam 7 for removing clean water from dam 7. A conduit or pipe 43 from waterway 6 upstream of dam 7 is connected to manifold 45 to provide a means of backwashing pipes 39 and screened water receiving ends 40 whenever necessary to unclog the system and to partially fluidize wall of carbon 20. Pipe 43 is provided with a screen means 70. A valve means 44 is positioned within pipe 43 upstream of manifold 45, and valve means 44 may be adjusted to be open or closed.

Figure 4:
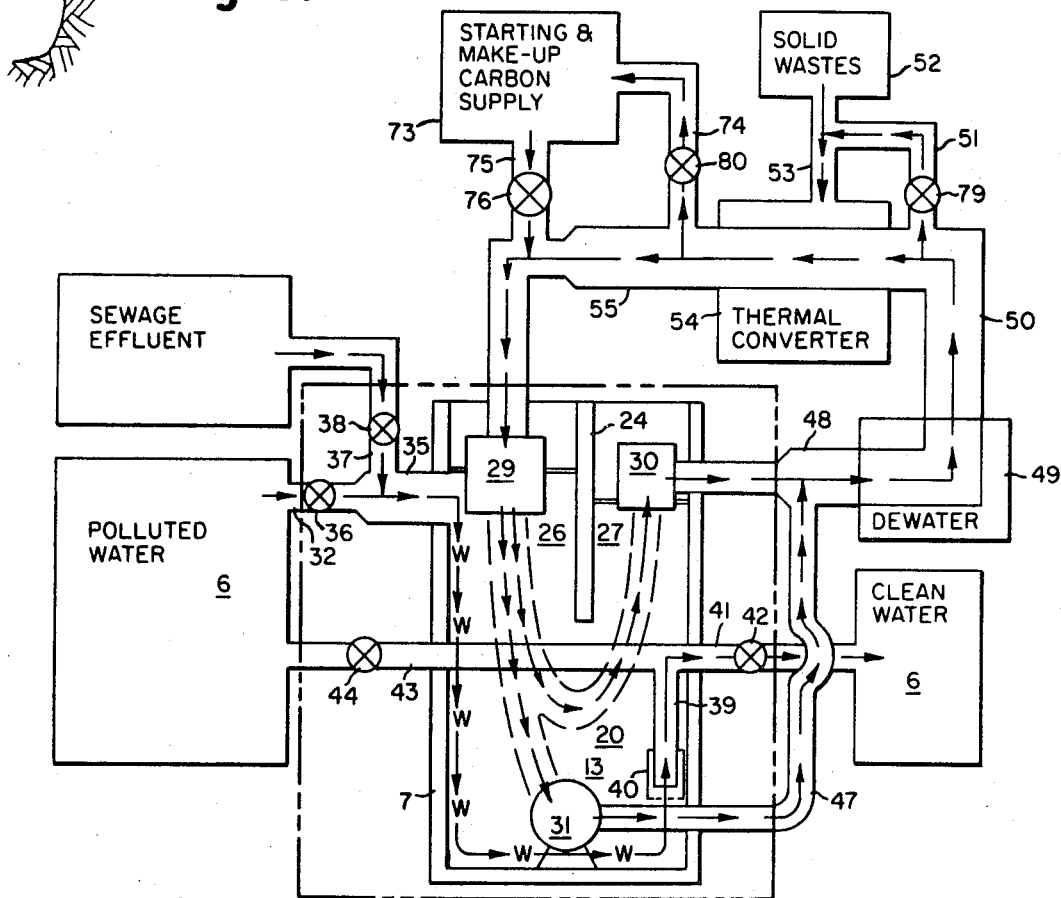
FIG. 4 is a diagrammatic flow chart illustrating the flows of water and carbon through the central portions of the embodiments of the invention shown in FIGS. 2 and 3.

Referring to FIGS. 2 and 4, in normal operation, valve means 36, 38, and 42 are open and valve means 44 is closed. Water from waterway 6 and sewage effluent from pipe 37 flow into first top part 26 of wall of carbon 20, downward through wall of carbon 20 to screened water receiving ends 40, and upward through pipes 39 and 41 back to waterway 6 downstream of dam 7. At convenient intervals valve means 36 and 38 are closed until the water level within dam 7 reaches the level of pipe 41, and then valve means 42 is closed and valve means 44 is opened to backwash the system and partially fluidize wall of carbon 20. During the backwash period, the only water flow is from waterway 6, through pipes 43 and 39 to screened water receiving ends 40 and up through wall of carbon 20 to relieve the compacting which will occur during normal operation. The water level inside hollow central portion 13 will rise to level 21, and then backwashing will be stopped and valve means 36, 38, 42, and 44 returned to normal position. Valve means 36, 38, 42, and 44 may conveniently be remotely controlled and their positioning shifted by hand or a predetermined mechanical or electrical control means, all conventional and well known in the art. Means for adding particulate carbon 29 continuously adds rejuvenated carbon to first top part 26 of wall of carbon 20. Particulate carbon continuously flows downward adsorbing pollutants which may be adsorbed relatively quickly, under baffle structure 24, and upward to second top part 27 of wall of carbon 20 where the major portion of spent carbon together with the pollutants adsorbed thereto is removed by means for extracting spent carbon 30. At the same, a minor portion of carbon together with other pollutant species, primarily small-molecule soluble species which are slowly adsorbed, is removed by means for extracting spent carbon 31. The reason for removing carbon from bottom portion 23 of wall of carbon 20 is that small-molecule soluble species of pollutants would saturate the wall of carbon beneath top portion 22, and that the fine particles of carbon would tend to clog the system.

Pipes 32 and 35 are designed to have a capacity to handle the mean flow of waterway 6 at mean low water level 17. Pipes 39 and 41 together with screened ends 40 and wall of carbon 20 are designed to have a backpressure equal to the hydrostatic head between nominal level 21 and the level 46 of the highest portion of pipe 41. Thus, the downward flow through wall of carbon 20 is at all times approximately the same, except when the level of waterway 6 is less than mean low water level 17, when it is less. But this is the time also when the pollution is at its highest concentration and when the flow through wall of carbon 20 must be slowest to provide time for the adsorption of pollutants.

Referring to FIG. 4, the spent carbon removed from wall of carbon 20 is conveyed by conveyors 47 and 48 to a dewatering device 49 and then by a conveyor 50 to a thermal converter 54, with a portion being selectively conveyed by a conveyor 51 to join with solid wastes 52 conveyed by a conveyor 53 into thermal converter 54. Thermal converter 54 has charring tubes which carbonized the spent carbon and the pollutants adsorbed thereon. The rejuvenated carbon is then conveyed by a conveyor 55 to means for adding particulate carbon 29 for recycling through applicants' system. A starting and make-up carbon supply 73 provides carbon whenever the system is started or when needed to supplement the carbon supply to dam 7. At times when the pollutants are very heavy, excess carbon may be diverted from conveyor 55 to a conveyor 74 connected to supply 73. A conveyor 75 is provided to connect supply 73 to conveyor 55 whenever additional carbon is needed. At times when pollutants are light, all the carbon from conveyor 50 may be needed for thermal converter 54, and therefore a control means 79 is provided to regulate flow within conveyor 51. Similarly control means 80 and 76 regulate the flow within conveyors 74 and 75 respectively. Elements 47, 48, 49, 50, 51, 52, 53, 54, 55, 73, 74, 75, 76, 79, and 80 are conventional and are included for purposes of clarity. Thermal converter 54 may be similar to that disclosed in U. S. Pat. No. 3,471,369, and the general recycling system may be as taught in applicants' copending U. S. Pat. application entitled: Mechanism and Method for Water Pollution Abatement, Ser. No. 844,311, filed July 24, 1969, now U. S. Pat. No. 3,622,509. The installation embodying applicants' invention will operate satisfactorily if the new carbon is supplied from another source.

Throughout this application pipes or manifolds have been shown as means for delivering water or fluid from one point to another. The term conduit will be used to define one or more connected pipes or manifolds and any auxiliary attached equipment, such as screen means. In order to provide the necessary flow cross-section and flow distribution all pipes may be either of suitable diameter or of manifold design. Further, all conveyors, extractors, means for adding, means for extracting, and their associated controls or control means disclosed are conventional and may include all types of prior art devices suitable for the intended function.

The spent carbon contains both the inorganic pollutants from the contaminated water and the organic pollutants from the sewage effluent. During treatment in converter 54, the latter are converted to carbon and low-molecular-weight gases. These gases may be vented to the atmosphere, or if they contain harmful or valuable species, they may be scrubbed, selectively adsorbed, or otherwise treated, or they may be added to intake pipe 32 to ameliorate the adsorbability of the pollutants, and to provide an inexpensive way of extracting harmful water-soluble moieties, the remainder being allowed to vent through vent 15 in roof 14. In winter particularly, adding the hot gases to the intake would serve to prevent icing in any part of the system. The carbon from the thermal conversion of the organic pollutants joins the carbon that has been passed through the water-treatment cycle previously. This would continuously increase the mass of the circulating carbon load, were it not for the fact that a portion of the spent carbon is conveyed to the fire box of thermal converter 54 to provide all or a part of the fuel needed for carbonization; simultaneously, a part of the inorganic-pollutant load is fed to the fire box and ends up as ash, from which values may be recovered. This in turn prevents a continuous build-up of inorganic pollutant concentration in the circulating load; in fact, the inorganic load reaches an equilibrium value after several recyclings. Other techniques are described in the above-identified application, Ser. No. 844,311, for modifying the activity of the carbon, and leaching methods may be applied to the spent carbon before its recarbonization to modify further the composition of the circulating load, if desired, by selective dissolution or by ion exchange.

For use in removing inorganic pollutants from lacustrine, riverine, or coastal inlets, where a hydrostatic head is not available to drive the water-sewage effluent mixture flows, a modification of the installation of FIG. 2 is necessary. Referring again to FIG. 1, excavation 8 is positioned adjacent inlet 3. Excavation 8 may be lined with concrete or other water retaining material. Bridging excavation 8 is a retaining structure or dam 107, similar to dam 7 of FIG. 2.

Figure 3:
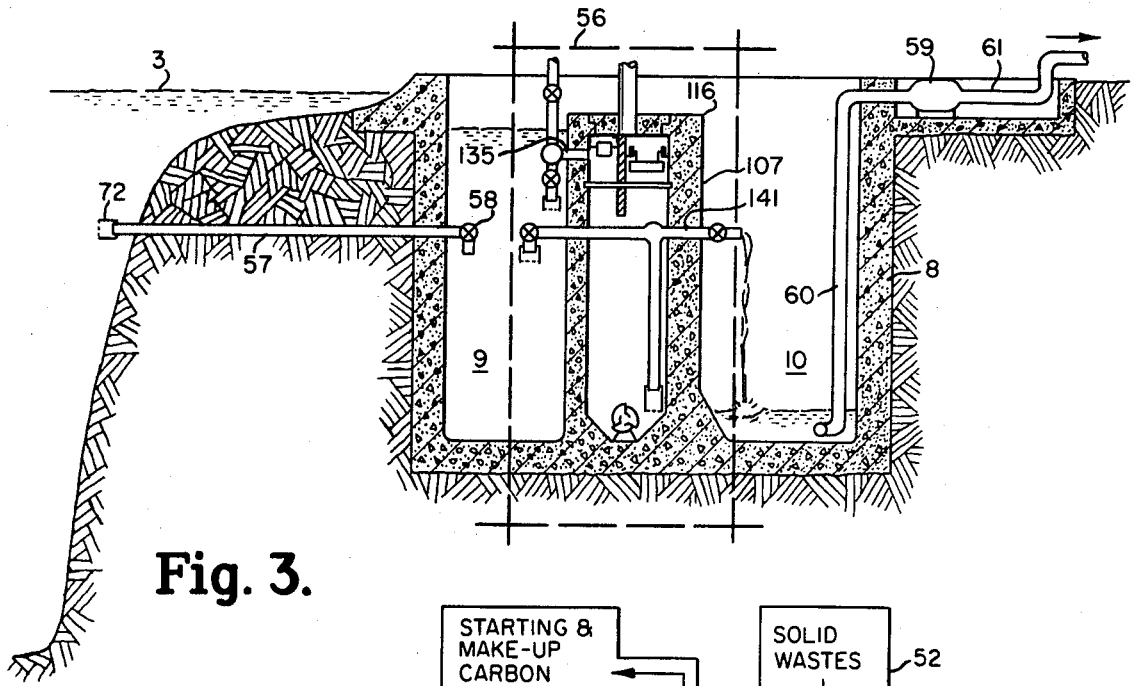
FIG. 3 is a sectional view of an additional embodiment of the invention.

Referring to FIG. 3 in detail, the portion within dashed lines 56, including dam 107 and all the necessary pipes and valve means is similar in all respects to the structure described with respect to FIG. 2, and throughout the description of FIG. 3, reference numerals 100 higher than those used in FIG. 2 will be used to designate elements similar to those in FIG. 2. However, since the hydrostatic head of a flowing waterway is not available, highest portion 116 of dam 107 is positioned at the mean low water level of inlet 3. A conduit or pipe 57 connects inlet 3 with the first water retaining area 9 at a level beneath pipe 135. Screen means 72 on pipe 57 prevents clogging of pipe 57. A valve means 58 is positioned within pipe 57 to control the level of water in water retaining area 9. Valve means 58 will be open at all times unless the water level in inlet 3 should exceed the highest portion 116 of dam 107, when it would be closed. Water and carbon flow through dam 107 in the same manner as through dam 7. Clean water discharged through pipe 141 collects in a second water retaining area 10 and may be pumped by a pump 59 through pipes 60 and 61 to a discharge point remote from dam 107, preferrably returned to main channel 5 of river 1 downstream from inlet 3. If a suitable water body is available at a lower level, pipe 60 and pump 59 may be omitted, as shown in FIG. 1.

Modification to the embodiments shown in FIGS. 1 to 4 include the following: (1) for certain installations the adsorption column positioned within a dam and driven by the available water head may be desirable without the admixture of sewage effluent to the polluted water, and with other recharging systems to rejuvenate the adsorption column; (2) the recharging system disclosed, with the adsorption column divided into two top portions and a bottom portion, may be desirable for other water depollution systems even when not positioned in a dam. Further, it may be desirable in certain installations to convey the carbon to be added to the wall of carbon in a flowable form, such as a slurry containing at least 20 percent carbon solids, by weight.

In view of our invention and disclosures, other variations and modifications will become evident to others skilled in the art, to obtain all or part of the benefits of our invention without copying the structures and methods shown, and we, therefore, claim all such insofar as they fall within the reasonable spirit and scope of our claims.

Having thus described our invention, what we claim as new and desire to secure by Letters Patent is:

1. In a system for cleaning polluted water, the combination comprising:

a waterway containing polluted water, said waterway having a mean low water level and a mean flow at said mean low water level;

a retaining structure bridging said waterway and having an upstream side, a downstream side, a generally vertical hollow central portion therebetween, and a roof covering said hollow central portion, the highest portion of said retaining structure being generally horizontal and positioned a said mean low water level to prevent water below said level from passing over said retaining structure and to permit that portion of water above said level to pass downstream over said retaining structure, and said hollow central portion having an interior water level;

a wall of carbon supported within said hollow central portion of said retaining structure, said wall of carbon being particulate, having a top portion and a bottom portion, and substantially filling said hollow central portion up to said interior water level;

a baffle structure supported by said retaining structure, said baffle structure positioned to divide at least a major portion of said top portion of said wall of carbon into a first top part and a second top part, and said baffle structure restricting the flow of particulate carbon within said top portion of said hollow central portion between said first top part and said second top part;

a first conduit connected to a source of sewage and connected to discharge into said first top part of said wall of carbon;

a first valve means positioned within said first conduit intermediate said source of sewage and said wall of carbon, said first valve means normally open and adapted to control the flow of sewage to said wall of carbon;

a second conduit connecting said polluted water in said waterway upstream from said retaining structure to said first top part of said wall of carbon, said second conduit having a capacity to handle said mean flow of said waterway and including an intake end positioned within said polluted water and below said interior water level;

a second valve means positioned within said second conduit intermediate said intake end and said wall of carbon, said second valve means normally open and adapted to control the flow of polluted water to said wall of carbon;

a means for adding particulate carbon supported by said retaining structure, said means for adding connected to a source of particulate carbon, and positioned so that said particulate carbon is added to said first top part of said wall of carbon;

a first means for extracting carbon supported by said retaining structure and positioned so that carbon extracted thereby is removed from said second top part of said wall of carbon;

a second means for extracting carbon supported by said retaining structure and positioned so that carbon extracted thereby is removed from said bottom portion of said wall of carbon;

a third conduit supported by said retaining structure, said third conduit including a screened water receiving end positioned adjacent said bottom portion of said wall of carbon and a discharge end which discharges clean water from said retaining structure, said third conduit connecting said water receiving end to said discharge end and having a highest elevation at a second water level which is substantially lower than said interior water level within said hollow central portion of said retaining structure;

a third valve means positioned within said third conduit upstream from said discharge end of said third conduit, said third valve means normally open and adapted to stop the flow of clean water when actuated;

a fourth conduit connecting said polluted water in said waterway upstream from said retaining structure to said third conduit between said water receiving end thereof and said third valve means;

a fourth valve means positioned within said fourth conduit upstream from said third conduit, said fourth valve means normally closed and adapted to open a flow of polluted water to said third conduit when actuated;

each of said first, second, third, and fourth valve means adapted to be temporarily reversed to permit said polluted water from said waterway to backwash a portion of said third conduit and said screened water receiving end, and to partially fluidize said wall of carbon; and the hydrostatic head between said interior water level within said hollow central portion of said retaining structure and said second water level of said third conduit equals the combined back pressure of said wall of carbon and said third conduit when the flow passing through the system equals said mean flow, whereby the flow through said system remains substantially constant whenever said polluted water in said waterway equals or exceeds said mean low water level.

2. In a system for cleaning polluted water, the combination comprising:

a waterway containing water polluted with substantial amounts of inorganic pollutants, said waterway having a mean low water level and a mean flow at said mean low water level;

a retaining structure bridging said waterway and having an upstream side, a downstream side, a generally vertical hollow central portion therebetween, and a roof covering said hollow central portion, the highest portion of said retaining structure being generally horizontal and positioned at said mean low water level to prevent water below said level from passing over said retaining structure and to permit that portion of water above said level to pass downstream over said retaining structure, and said hollow central portion having an interior water level;

a wall of carbon supported by and within said hollow central portion of said retaining structure, said wall of carbon being particulate, having a top portion and a bottom portion, and substantially filling said hollow central portion up to said interior water level;

a baffle structure supported by said retaining structure, said baffle structure positioned to divide at least a major portion of said top portion of said wall of carbon into a first top part and a second to part, and said baffle structure restricting the flow of particulate carbon within said top portion of said hollow central portion between said first top part and said second top part;

a mixing chamber supported by said retaining structure;

a first conduit connected to a source of secondary sewage effluent containing substantial amounts of organic pollutants and connected to said mixing chamber;

a first valve means positioned within said first conduit intermediate said source of secondary sewage effluent and said mixing chamber, said first valve means normally open and adapted to control the flow of secondary sewage effluent to said mixing chamber;

a second conduit connecting said polluted water in said waterway upstream from said retaining structure to said mixing chamber, said second conduit having a capacity to handle said mean flow of said waterway and including an intake end positioned within said polluted water and below said interior water level;

a second valve means positioned within said second conduit intermediate said intake end of said second conduit and said mixing chamber, said second valve means normally open and adapted to control the flow of polluted water to said mixing chamber;

a third conduit connected to said mixing chamber and discharging a mixture of said polluted water and said secondary sewage effluent into said first top part of said wall of carbon;

a means for adding particulate carbon supported by said retaining structure, said means for adding connected to a source of particulate carbon, and positioned so that said particulate carbon is added to said first top part of said wall of carbon;

a first means for extracting carbon supported by said retaining structure and positioned so that carbon extracted thereby is removed from said second top part of said wall of carbon;

a second means for extracting carbon supported by said retaining structure and positioned so that carbon extracted thereby is removed from said bottom portion of said wall of carbon;

a fourth conduit supported by said retaining structure, said fourth conduit including a screened water receiving end positioned adjacent said bottom portion of said wall of carbon and a discharge end, said fourth conduit passing through said downstream side and connecting said water receiving end to said discharge end and having a highest elevation at a second water level which is substantially lower than said interior water level within said hollow central portion of said retaining structure;

a third valve means positioned within said fourth conduit upstream from said discharge end of said fourth conduit, said third valve means normally open and adapted to stop the flow of clean water when actuated;

a fifth conduit connecting said polluted water in said waterway upstream from said retaining structure to said fourth conduit between said water receiving end thereof and said third valve means;

a fourth valve means positioned within said fifth conduit upstream from said fourth conduit, said fourth valve means normally closed and adapted to open a flow of polluted water to said fourth conduit when actuated;

each of said first, second, third, and fourth valve means adapted to be temporarily reversed to permit said polluted water from said waterway to backwash a portion of said fourth conduit and said screened water receiving end, and to partially fluidize said wall of carbon; and the hydrostatic head between said interior water level within said hollow central portion of said retaining structure and said second water level of said fourth conduit equals the combined back pressure of said wall of carbon and said fourth conduit when the flow passing through the system equals said mean flow, whereby the flow through said system remains substantially constant whenever said polluted water in said waterway equals or exceeds said mean low water level.

3. In a system for minimizing the pollution in a water system, the combination comprising:

a first body of water having a first level of pollution;

a second body of water having a second level of pollution, said second body of water being substantially smaller than said first body of water and said second level of pollution being substantially higher than said first level of pollution, said second body of water connected to said first body of water by an area of restricted water-mixing;

an excavation positioned adjacent said second body of water;

a retaining structure bridging said excavation and dividing said excavation into a first water retaining area and a second water retaining area, said retaining structure having a hollow central portion, and said hollow central portion having an interior water level;

a wall of carbon supported within said hollow central portion of said retaining structure, said wall of carbon being particulate, having a top portion and a bottom portion, and substantially filling said hollow central portion up to said interior water level;

a baffle structure supported by said retaining structure, said baffle structure positioned to divide at least a major portion of said top portion of said wall of carbon into a first top part and a second top part, and said baffle structure restricting the flow of particulate carbon within said top portion of said hollow central portion between said first top part and said second top part;

a first conduit connecting said second body of water to said first water retaining area at a level to permit water to flow into said first water retaining area by gravity to maintain a substantial level of water in said first water retaining area;

a first valve means positioned within said first conduit, said first valve means normally open and adapted to control the flow of water to said first water retaining area;

a second conduit connecting said water in said first water retaining area to said first top part of said wall of carbon, said second conduit including an intake end positioned within said water in said first water retaining area and below said interior water level;

a second valve means positioned within said second conduit intermediate said intake end and said wall of carbon, said second valve means normally open and adapted to control the flow of polluted water to said wall of carbon;

a means for adding particulate carbon supported by said retaining structure, said means for adding connected to a source of particulate carbon, and positioned so that said particulate carbon is added to said first top part of said wall of carbon;

a first means for extracting carbon supported by said retaining structure and positioned so that carbon extracted thereby is removed from said second top part of said wall of carbon;

a second means for extracting carbon supported by said retaining structure and positioned so that carbon extracted thereby is removed from said bottom portion of said wall of carbon;

a third conduit supported by said retaining structure, said third conduit including a screened water receiving end positioned adjacent said bottom portion of said wall of carbon and a discharge end which discharges clean water from said retaining structure into said second water retaining area, said third conduit connecting said water receiving end to said discharge end and having a highest elevation at a second water level which is substantially lower than said interior water level within said hollow central portion of said retaining structure, whereby the water flow through said wall of carbon is provided by gravity flow;

a third valve means positioned within said third conduit, said third valve means normally open and adapted to stop the flow of said clean water when actuated;

a fourth conduit connecting said polluted water in said first water retaining area to said third conduit between said water receiving end thereof and said third valve means;

a fourth valve means positioned within said fourth conduit, said fourth valve means normally closed and adapted to open a flow of polluted water to said third conduit when actuated;

each of said second, third, and fourth valve means adapted to be temporarily reversed to permit said polluted water from said second water retaining area to backwash a portion of said third conduit and said screened water receiving end, and to partially fluidize said wall of carbon; and a means for returning said clean water to said water system at a substantial distance from said first conduit.

4. In a system for minimizing the pollution in a water system, the combination comprising:

a first body of water having a first level of pollution;

a second body of water having a second level of pollution, said second body of water being substantially smaller than said first body of water and said second level of pollution being substantially higher than said first level of pollution, said second body of water connected to said first body of water by an area of restricted water-mixing;

an excavation positioned adjacent said second body of water;

a retaining structure bridging said excavation and dividing said excavation into a first water retaining area and a second water retaining area, said retaining structure having a hollow central portion, and said hollow central portion having an interior water level;

a wall of carbon supported by and within said hollow central portion of said retaining structure, said wall of carbon being particulate, having a top portion and a bottom portion, and substantially filling said hollow central portion up to said interior water level;

a baffle structure supported by said retaining structure, said baffle structure positioned to divide at least a major portion of said top portion of said wall of carbon into a first top part and a second top part, and said baffle structure restricting the flow of particulate carbon within said top portion of said hollow central portion between said first top part and said second top part;

a mixing chamber supported by said retaining structure;

a pipe connecting said second body of water to said first water retaining area at a level to permit water to flow into said first water retaining area by gravity to maintain a substantial level of water in said first water retaining area;

a first conduit connected to a source of secondary sewage effluent containing substantial amounts of organic pollutants and connected to said mixing chamber;

a first valve means positioned within said first conduit intermediate said source of secondary sewage effluent and said mixing chamber, said first valve means normally open and adapted to control the flow of secondary sewage effluent to said mixing chamber;

a second conduit connecting said water in said first water retaining area to said mixing chamber, said second conduit including an intake end positioned within said water in said first water retaining area and below said interior water level;

a second valve means positioned within said second conduit intermediate said intake end of said second conduit and said mixing chamber, said second valve means normally open and adapted to control the flow of polluted water to said mixing chamber;

a third conduit connected to said mixing chamber and discharging a mixture of said polluted water and said secondary sewage effluent into said first top part of said wall of carbon;

a means for adding particulate carbon supported by said retaining structure, said means for adding connected to a source of particulate carbon, and positioned so that said particulate carbon is added to said first top part of said wall of carbon;

a first means for extracting carbon supported by said retaining structure and positioned so that carbon extracted thereby is removed from said second top part of said wall of carbon;

a second means for extracting carbon supported by said retaining structure and positioned so that carbon extracted thereby is removed from said bottom portion of said wall of carbon;

a fourth conduit supported by said retaining structure, said fourth conduit including a screened water receiving end positioned adjacent said bottom portion of said wall of carbon and a discharge end which discharges clean water from said retaining structure into said second water retaining area, said fourth conduit connecting said water receiving end to said discharge end and having a highest elevation at a second water level which is substantially lower than said interior water level within said hollow central portion of said retaining structure, whereby the water flow through said wall of carbon is provided by gravity flow;

a third valve means positioned within said fourth conduit, said third valve means normally open and adapted to stop the flow of said clean water when actuated;

a fifth conduit connecting said polluted water in said first water retaining area to said fourth conduit between said water receiving end thereof and said third valve means;

a fourth valve means positioned within said fifth conduit, said fourth valve means normally closed and adapted to open a flow of polluted water to said fourth conduit when actuated;

each of said first, second, third, and fourth valve means adapted to be temporarily reversed to permit said polluted water from said second water retaining area to backwash a portion of said fourth conduit and said screened water receiving end, and to partially fluidize said wall of carbon; and a means for returning said clean water to said water system at a substantial distance from said pipe.

* * * * *